(12) United States Patent
Pellenc et al.

(10) Patent No.: US 7,650,740 B2
(45) Date of Patent: Jan. 26, 2010

(54) REMOVABLE SCALE FOR ARTICULATED RECEIVER PLATFORM EQUIPPING SMALL FRUIT HARVESTING MACHINES

(75) Inventors: Roger Pellenc, Pertuis (FR); Jean-Marc Gialis, Pertuis (FR)

(73) Assignee: PELLENC Societe Anonyme, Pertuis (FR)

( * ) Notice: Subject to any disclaimer, the term of this patent is extended or adjusted under 35 U.S.C. 154(b) by 0 days.

(21) Appl. No.: 12/021,240

(22) Filed: Jan. 28, 2008

(65) Prior Publication Data

US 2008/0178570 A1    Jul. 31, 2008

(30) Foreign Application Priority Data

Jan. 29, 2007   (FR) .................................. 07 00585

(51) Int. Cl.
*A01D 46/00*   (2006.01)
(52) U.S. Cl. .......................................... 56/330; 56/329
(58) Field of Classification Search ................ 56/328.1, 56/330, 329
See application file for complete search history.

(56) References Cited

U.S. PATENT DOCUMENTS

| 3,449,895 | A | * | 6/1969 | Pertics ......................... 56/330 |
| 3,690,054 | A | * | 9/1972 | De Carlo et al. .............. 56/330 |
| 4,464,888 | A | * | 8/1984 | Burton ......................... 56/330 |
| 2003/0024229 | A1 | * | 2/2003 | Briesemeister ............. 56/340.1 |

* cited by examiner

*Primary Examiner*—Alicia M Torres
(74) *Attorney, Agent, or Firm*—Egbert Law Offices PLLC

(57) ABSTRACT

Removable scale for articulated receiving platform equipping small fruit machines such as for example, grape harvesting machines. The removable scale is made of two parts, namely a first anchor and articulation part. The first part has a fastening lug attached onto the carrying boom of a row of scales and a flexible articulation and assembling lug attached to the fastening lug. There is a second flat part forming the scale itself. The first and second parts are provided with additional quick assembly and disassembly device formed by an automatic locking device in an assembling position, accessible from the top of the removable scale.

13 Claims, 10 Drawing Sheets

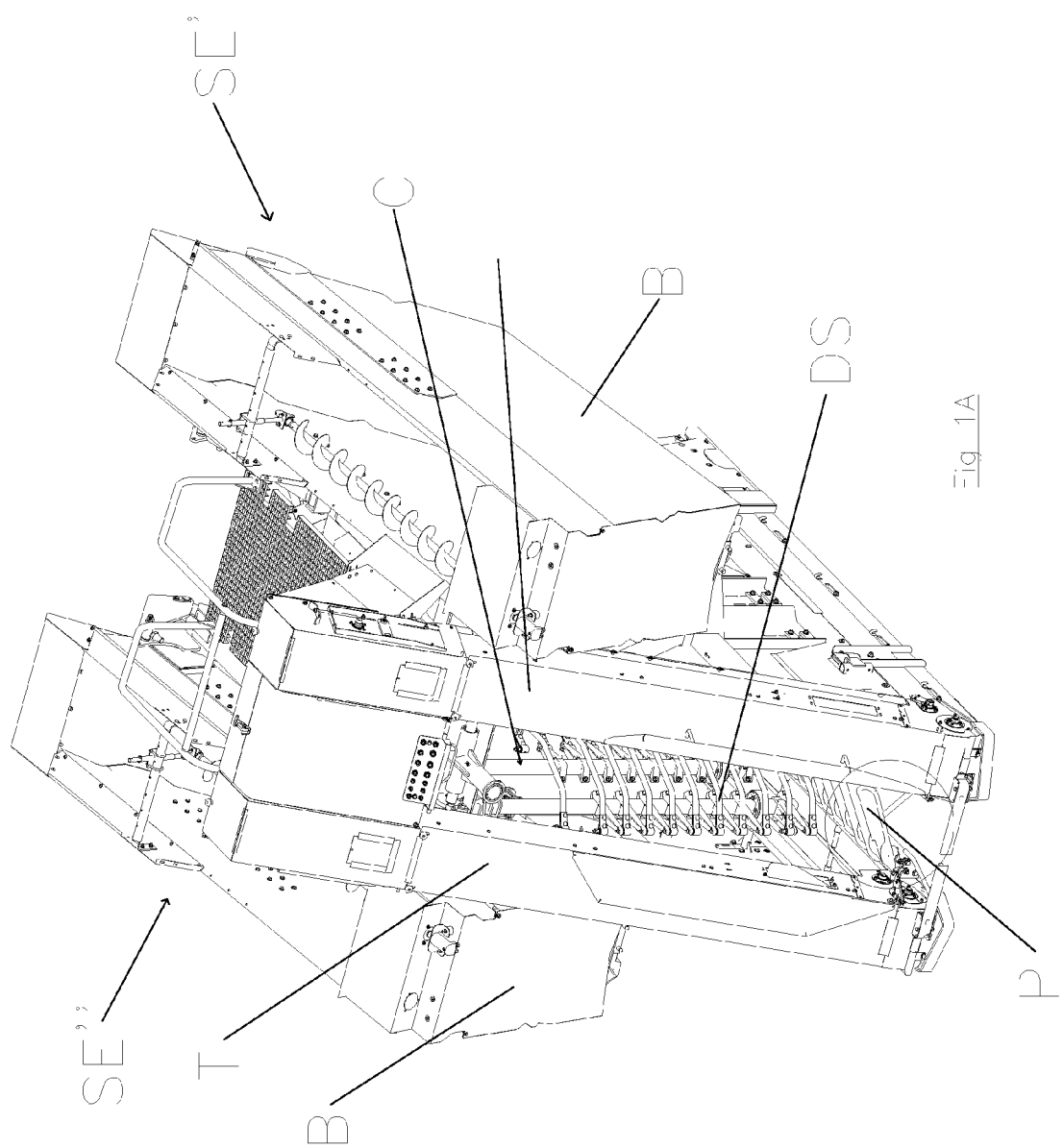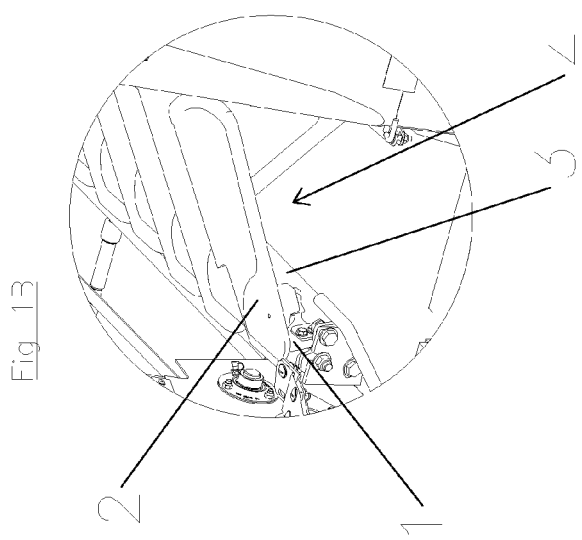

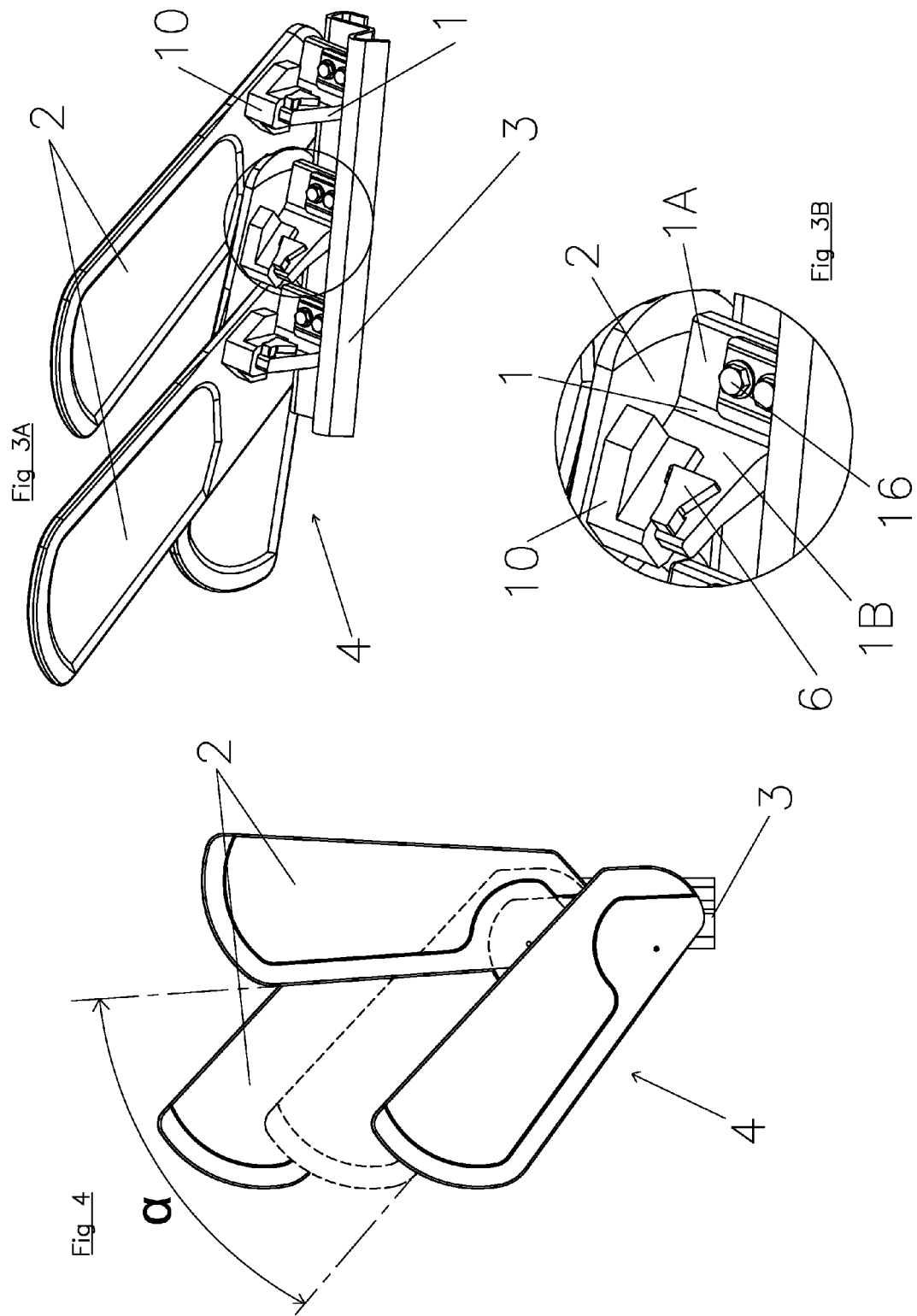

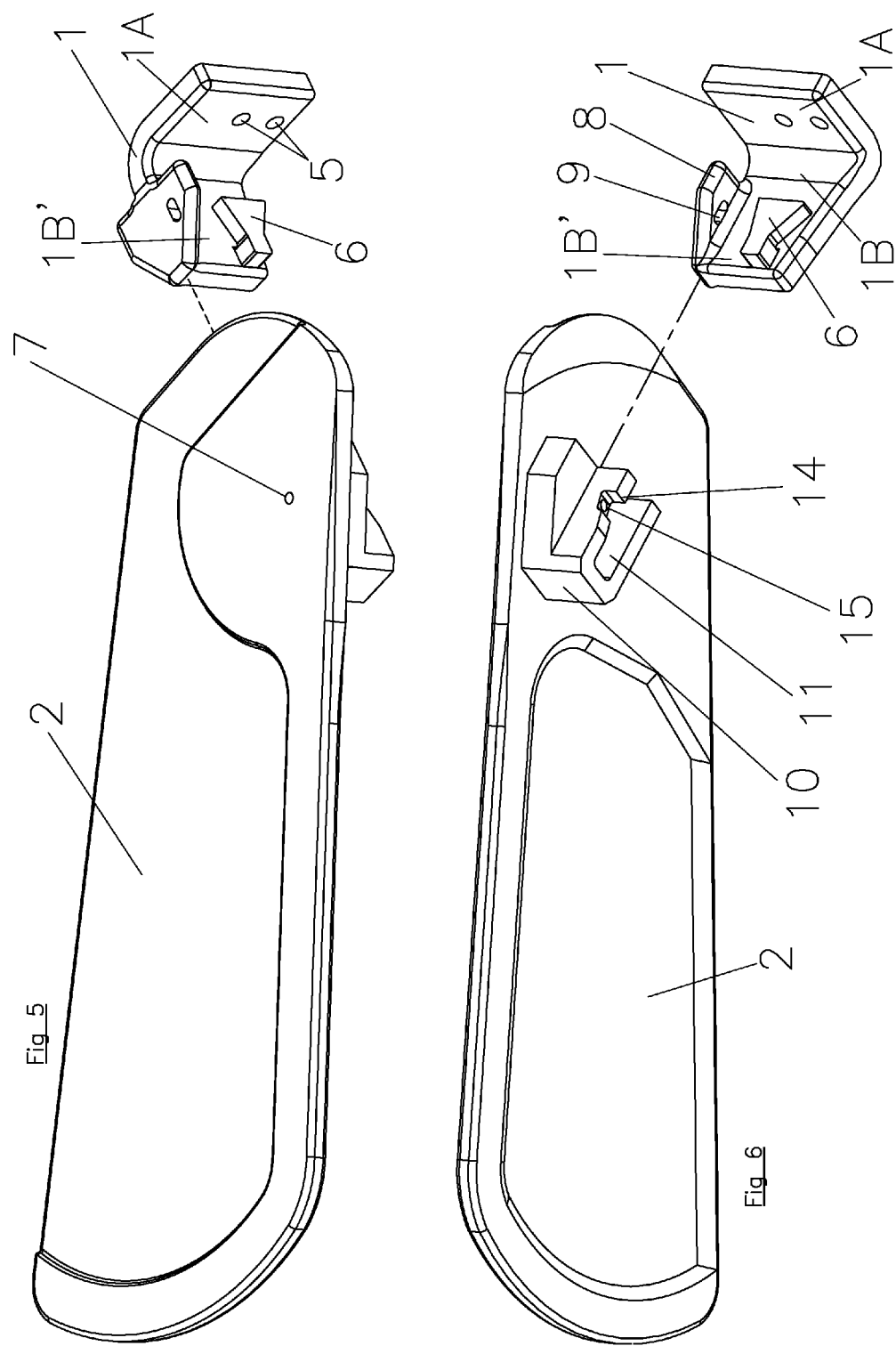

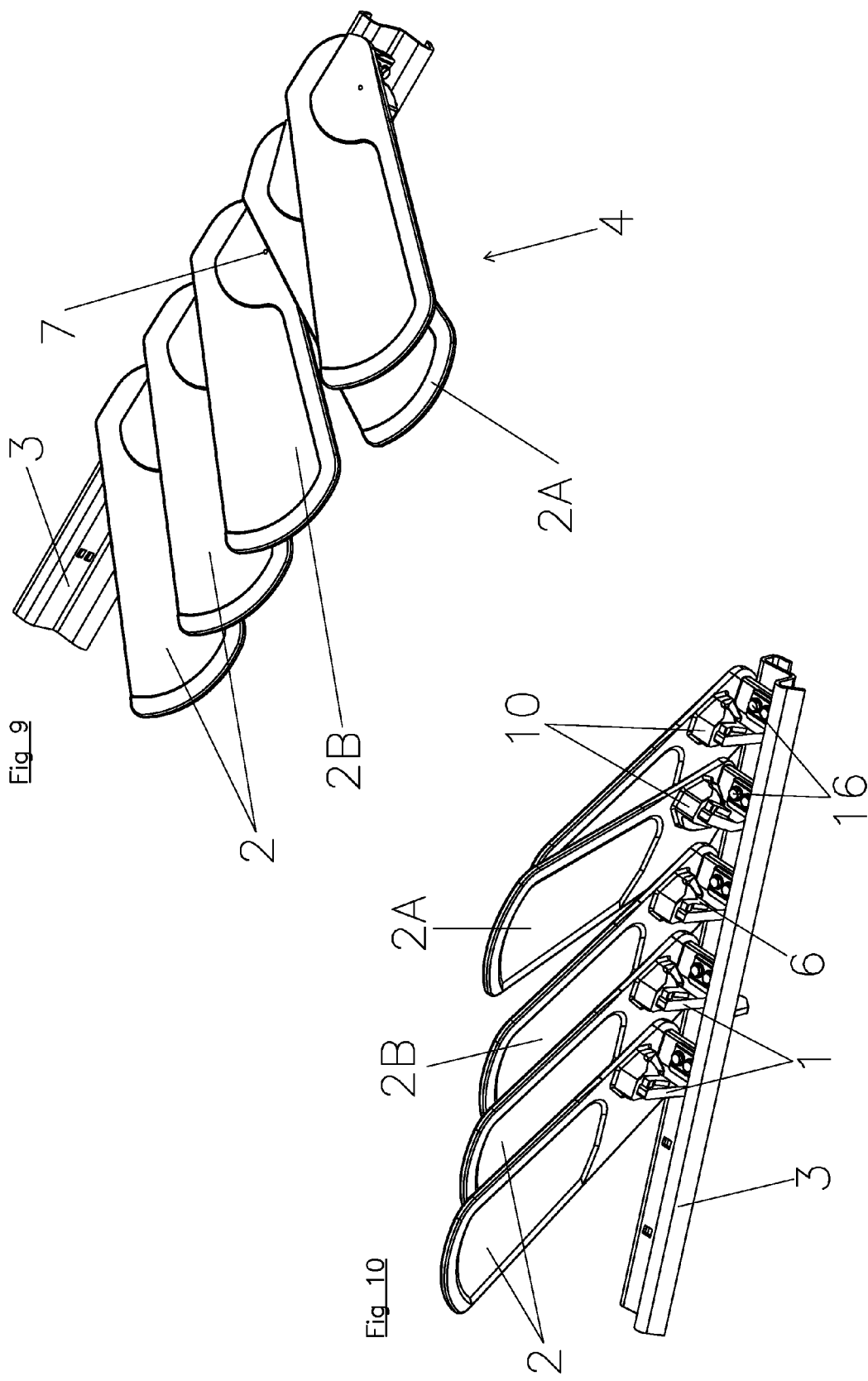

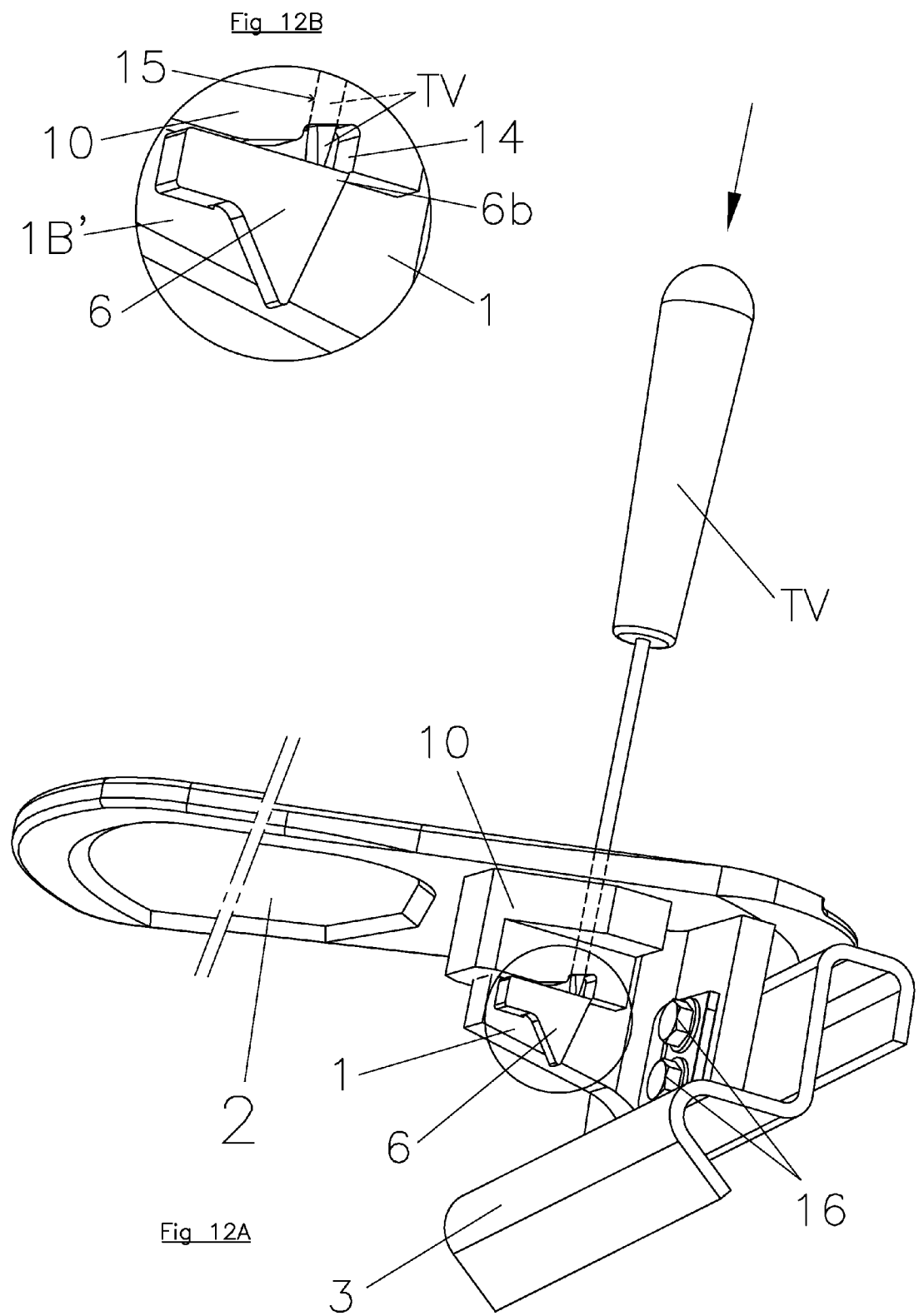

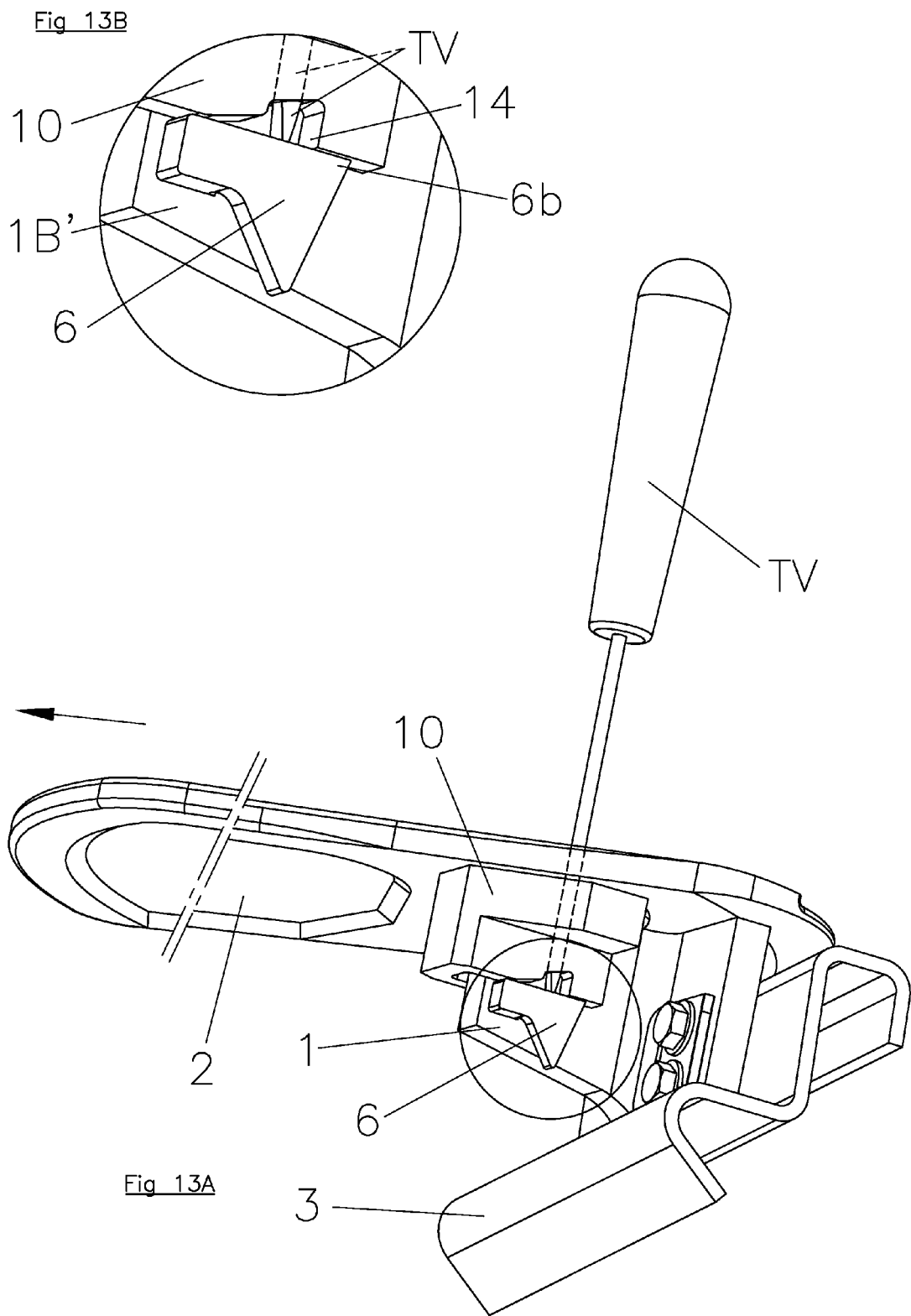

US 7,650,740 B2

REMOVABLE SCALE FOR ARTICULATED RECEIVER PLATFORM EQUIPPING SMALL FRUIT HARVESTING MACHINES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention concerns a removable scale for an articulated detached fruit receiving platform, equipping some small fruit harvesting machines, such as most of the machines used to harvest grapes.

2. Description of Related Art Including Information Disclosed Under 37 CFR 1.97 and 37 CFR 1.98.

Berry or small fruit harvesting machines are well-known (FIG. 1), especially grape harvesting machines, consisting of two subassemblies SE', SE", rigidly assembled at their upper part and between which a corridor C is provided that allows for their movement on each side of a row of vine stocks or other plants, straddled over by the machines. Each of said subassemblies comprise a fruit detaching system usually consisting of a shaking device DS; a receiving device for the detached fruit, most frequently consisting of an articulated platform P consisting of inclined and pivoting overlapping plates or scales; a transport device T for the collected raw harvest, discharged by the articulated platform; and, usually, a harvest receiving bin B or a discharge device for said harvest.

The articulated platform P receiving the fruit detached by the shaking device is thus made of two subassemblies, each consisting of several pivoting scales, arranged in succession, and partially overlapping one another with an orientation contrary to the forward movement of said machine, when working. The inside edge of the row of scales of one of the articulated platform subassemblies covers the inside edge of the row of scales of the other subassembly so that all of the harvest is collected on said articulated platform that does not have any gap causing part of the crop to fall on the ground, including when going by the stocks or palisade stakes when the scales pivot while encircling said stocks or stakes.

The scales of each articulated platform subassembly are usually made out of plastic and are attached onto an horizontal metallic boom, consisting for example of a sturdy section achieved by bending a steel plate.

Based on the fact that a more or less large volume of berries or small fruit from certain plants, for example, bunches from numerous varieties of grape, grows on the lower part of the plants, the articulated platform of harvesting machines finds itself positioned at a reduced distance from the ground, usually at a height of approx. 18 cm.

There exist several types of scales used to make up articulated platforms for harvesting machines of the above-mentioned type.

According to a first type, the scales are cast from one single piece and comprise a fastening lug attached to the scale itself through a flexible attachment portion under high stress during work.

A disadvantage specific to this type of scale comes from the need to make them out of a material that is both flexible and highly shock and wear resistant. This requirement makes it necessary to make the scale itself with a significant thickness, which has an adverse effect on its cost, which is not insignificant if one keeps in mind that each articulated platform subassembly comprises 30 to 40 scales.

According to another type disclosed in U.S. Pat. No. 5,647,194, the scale itself is attached to a fastening lug through a SILENTBLOC™ system.

U.S. Pat. No. 3,449,895 describes an articulated platform receiving scale for harvesting machines, consisting of at leas three major parts: a pivoting carrying arm; a rotating receiving disk connected to the pivoting arm through an articulation device (itself consisting of three elements); and a return spring braced through its opposite ends onto the pivoting arm and onto the carrying boom. This is a complex and costly system.

Regardless of the type of scale included in the above-described state of the art, whenever the articulated platform is made, the fastening components (screws and nuts or else) of the scales onto the carrying boom become covered by the portion of said scales that is close to said boom so that the fastening devices are not accessible from the top of the row of scales. In those conditions, in case of deterioration of one of the scales (resulting, for example, from the rupture of the flexible portion or damage to the SILENTBLOC™ system ensuring the attachment of the scale itself to its fastening lug on the carrying boom), its mandatory immediate replacement with a new scale is an extremely difficult and laborious operation. The repairman must indeed lie down on the ground to access from the bottom of the scale boom the fastening lugs of the failing scale to be replaced. The laboriousness of such operation can become worse in case of bad weather (rain, wind) or muddy soil.

One goal of this invention is thus to allow for the removal of a scale put out of service and for its quick replacement with a new scale, without excessive problems, from the top of the scale boom.

BRIEF SUMMARY OF THE INVENTION

Under the invention, this goal can be achieved using a scale made of elements or distinct parts, namely: a first anchor and articulation part comprising a fastening lug attached on the boom carrying a row of scales and a flexible assembling and articulation lug attached to said fastening lug, and a second flat part consisting of the scale itself. The first and second parts are provided with additional quick assembly and disassembly means, comprising an automatic locking device in assembling position, at the end of the mounting movement.

According to an especially advantageous embodiment, the scale is provided with an opening making it possible to act on the locking device to unlock it, said opening being accessible from the top of said scale.

Using these arrangements, the flat part making up the scale itself is easily and quickly interchangeable, regardless of the position of the scale to be replaced on the articulated platform subassembly. The latter is complete, without the scale flexible articulation lug having been removed beforehand.

According to a preferred embodiment, the interchangeable mounting means for the second part, consisting of the scale itself onto the first fastening and articulation part, comprises a socket assembling device of one of the elements of this device into the second element of the latter, working together with a shoulder provided on the second element so as to ensure automatically the interlocking of said elements. At the end of the assembling movement, a port is provided within the scale thickness, such port permitting to access the swinging latch whenever it is in locking position so as to permit its swinging and the disconnection of the two parts of the scale.

According to an advantageous arrangement, the separable assembling means for the first part and second part comprise a socket fastening block located on the underside of the interchangeable scale and provided with a vertical slot designed to engage a portion of the flexible articulation lug.

According to another advantageous arrangement, the upper part of the engagement portion of the flexible articulation lug is provided with a support plate, oriented perpendicular to said flexible articulation lug while a slot is provided between the scale underside and the socket fastening block for engagement of said support plate.

According to another advantageous arrangement, the automatic locking device comprises a swinging latch attached preferably elastically to one of the lateral faces of the engagement portion of the flexible articulation lug. The swinging latch comprises a catch working together with a retaining shoulder provided on the lower edge of one of the parts defining the receiving slot of the engagement portion of said flexible articulation lug and accessible from a hole made within the thickness of the scale.

Using the above arrangements, it is possible to achieve a solid mounting of the scale itself onto the fastening and articulation part, said scale being indeed firmly secured in relation to said part in all possible directions (3 rotations and 3 translations).

BRIEF DESCRIPTION OF THE SEVERAL VIEWS OF THE DRAWINGS

The above purposes, characteristics and advantages and many more will become clearer from the description below and the attached drawings.

FIG. 1A is a perspective view of one embodiment of harvesting head of a grape harvester to which the invention can apply.

FIG. 1B is a detailed sectional view at a larger scale of FIG. 1A.

FIG. 3A is a perspective top view of a portion of the articulated platform consisting of scales under the invention.

FIG. 3B is a detailed sectional view at a larger scale of FIG. 3A.

FIG. 4 is a perspective bottom view of FIG. 3, said figure and the preceding one show the possible pivoting of a scale per an angle α using the hinge under the invention.

FIG. 5 is an exploded perspective top view of a two-piece scale under the invention.

FIG. 6 is an exploded perspective bottom view of FIG. 5.

FIG. 9 is a partial perspective top view showing the pivoting of the scale preceding the damaged scale to be replaced among a row of scales so as to uncover the port giving access to the swinging latch locking/unlocking the latter, from the top of the row of scales so as to permit the release and removal of said damaged scale.

FIG. 10 is an exploded perspective bottom view of FIG. 9.

FIGS. 11A, 11B, 12Ar 12B, 13A, 13B, 14 are perspective views showing the disconnection of the two parts of a scale using a simple screwdriver to proceed with the replacement of the part making up the receiving part of said scale.

DETAILED DESCRIPTION OF THE INVENTION

Figure 2A:
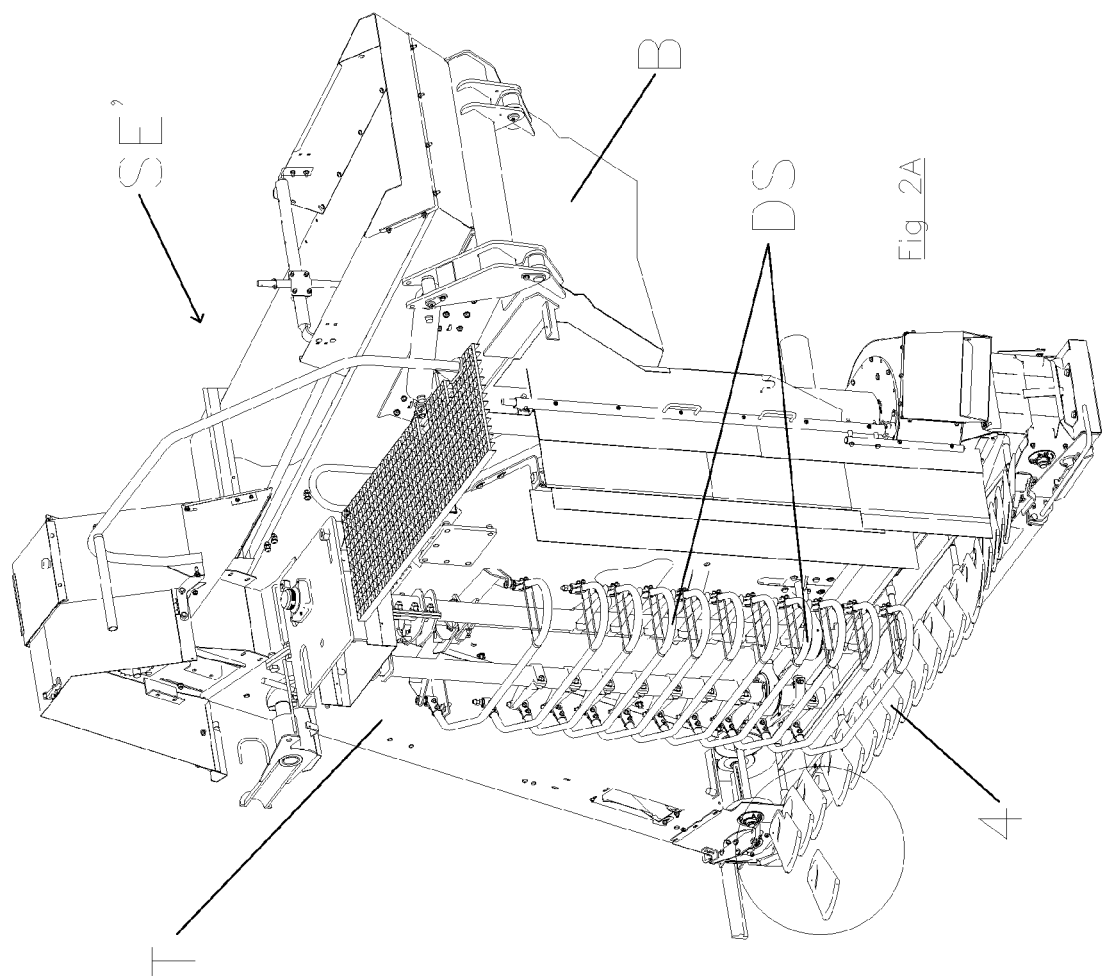
FIG. 2A is a perspective view of one of the subassemblies of said harvesting head.
Figure 2B:
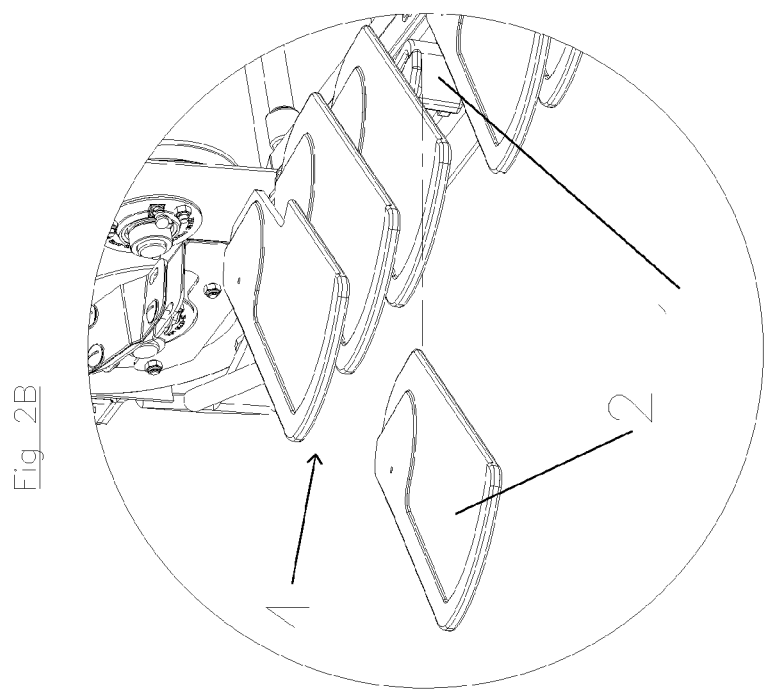
FIG. 2B is a detailed sectional view at a larger scale of FIG. 2A.
Figure 7:
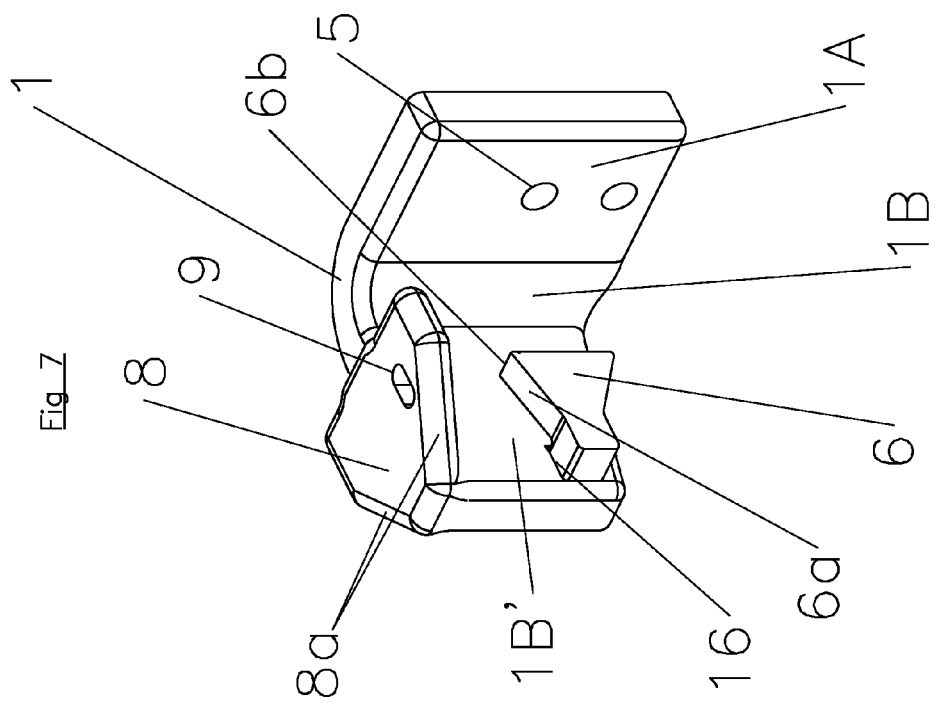
FIG. 7 is a perspective top view of the articulation anchor lug of this scale.
Figure 8:
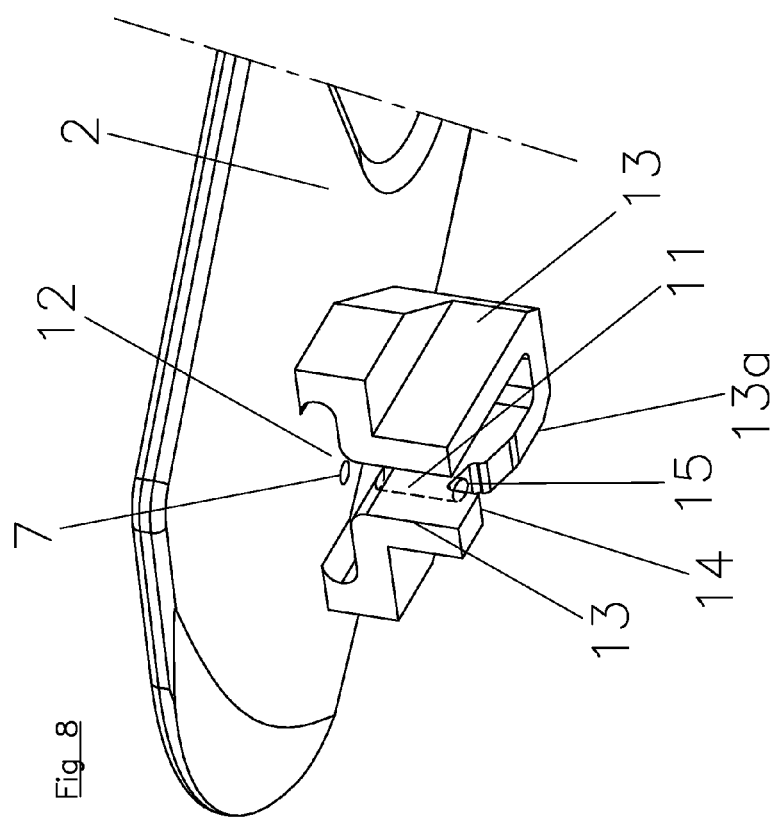
FIG. 8 is a partial perspective bottom view showing more specifically the socket or fastening block provided on the underside of said scale.

Reference is made to said drawings to describe an interesting, although not limiting, embodiment of the removable scale under the invention.

In the following description, words are used such as "upper", "lower", "vertical", "horizontal", "inclined", etc., based on a theoretical position of a harvesting machine equipped with an articulated platform while working; however, these terms are not limiting.

The removable scale under the invention consists of only two elements or distinct parts 1 and 2, assembled in a separable manner, i.e., a first part 1 attached onto a horizontal carrying boom supporting one of the rows 4 of scales of the articulated platform P, and a second part 2 consisting of the scale itself, designed to be positioned in an interchangeable manner on said first part.

The anchor and articulation part 1 or hinge comprises, on one hand, a fastening lug 1A provided with holes 5 to run through the shafts of the assembling components 16 (for example, bolts) permitting its fixed mounting onto the carrying boom 3, and, on the other hand, a flexible articulation and assembling lug 1B connected to said fastening lug 1A while forming, viewed from above, an angle with the latter, for example a 90° or about 90° angle. In a preferred manner, the first anchor and mounting part 1 are made of one single piece out of any suitable flexible material, such as thermoplastic elastomers (TPE), for example, HYTREL™.

Furthermore, the second part 2 constituting the scale itself is made out of a different material with good shock and wear resistance qualities, such as polyamide and, more specifically BERGAMID™ 66 A70, which makes it possible to make the second part 2 with a reduced thickness (approx. 10 mm in an edge designed to come in contact with the vine stocks and stakes and significantly thinner in its remaining surface).

The first and second parts 1 and 2 are provided with additional quick assembly and disassembly means, comprising an automatic locking device in a coupling position, accessible from the top of the scale, for which a very advantageous embodiment is described below in this presentation.

According to this embodiment, the interchangeable mounting means of the scale 2 onto the fixed anchor and articulation part 1 comprise a socket assembling device of one of the elements of this device into the second element of the latter, and a swinging latch 6 integral with one of the elements and working together with a shoulder or notch provided on the second element, a port 7 being provided within the thickness of the scale, permitting to access the swinging latch whenever it is in locking position.

In a preferred manner, the swinging latch 6 is carried by one of the lateral faces of an engagement portion 1B' of the flexible articulation lug 1B of the anchor and fastening part 1 of the scale 2. It is advantageously cast in one single piece with said engagement portion and elastically attached to the latter. It comprises a sloped edge 6a and a locking catch 6b.

The upper edge of the assembling portion 1B' is provided with a support plate 8, oriented perpendicular to said assembling portion that thus features a T section. One of the sides of the support plate 8 comprises an oblong-shaped port 9 located above and plumb with the swinging active part of the latch 6. The free end of the support plate 8 may have beveled edges 8a in order to facilitate insertion of the assembling portion 1B' into the slots of the socket piece equipping the underside of the scale 2.

The separable assembling means for the first part 1 and second part 2 of the scale comprise also a socket or fastening block 10 located on the underside of the second part consisting of the pivoting scale itself. In a preferred manner, said socket is cast from one single piece with the scale itself 2 in a material identical or not to that of the anchor and fastening part 1.

The socket or fastening block 10 features a vertical slot 11 opening downward and oriented obliquely in relation to the long axis of the scale 2, as shown in FIG. 6. This slot has a width permitting insertion and sliding of the coupling portion 1B' of the anchor and fastening part 1. On the other hand, a second slot 12 is provided perpendicular to the slot 11, between the underside of the scale and the fastening block for the insertion and sliding of the support plate 8 of said coupling portion 1B' without a significant clearance.

The lower edge 13a of one of the walls 13, defining the slot 11 receiving the coupling portion 1B' of the fixed part 1, is provided with a shoulder or notch 14 against which the locking catch 6b of the swinging latch 6 engages automatically at the end of the sliding travel of said coupling portion in said slot.

In the coupling position of both components 1, 2 of the removable scale, the hole 7 made within the thickness of the scale itself communicates with the port 9 running through the support plate 8, which itself communicates with a vertical hole 15 made in the wall 13 and ending in the back of the shoulder or notch 14. In this position, the holes 7, 9 and 15 make up an opening located plumb with the swinging latch 6, providing access to the latter.

The swinging latch 6 features a sloped upper edge 6a and is connected to one of the sides of the coupling portion 1B', through a lateral excrescence or protrusion 17 acting through elastic torsion and making up the swinging axis of said latch.

Figure 11B:
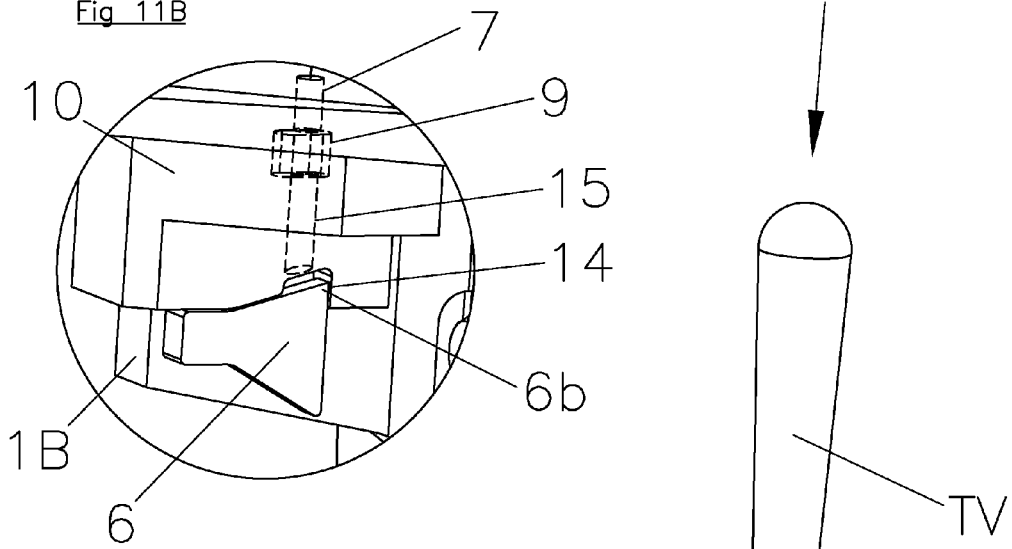
Figure 11A:
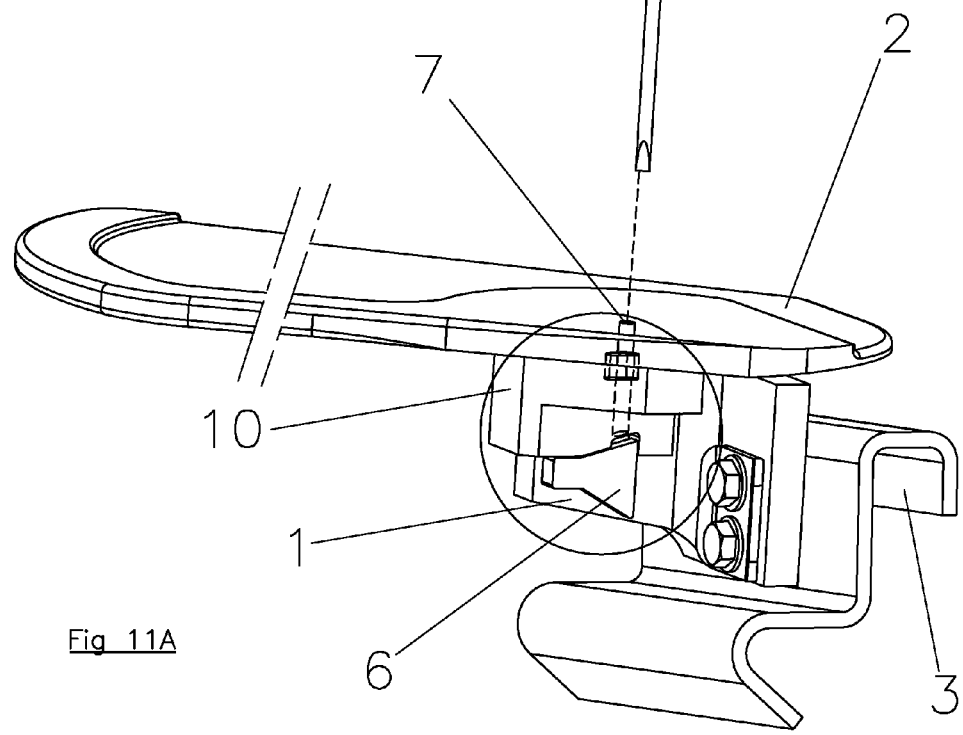

In the fastening position (FIG. 11), the coupling portion 1B' and the support plate 8 of the fixed part 1 are driven into the slots 11 and 12 respectively of the socket of the interchangeable part 2. The latch 6 abuts against the shoulder or notch 14 and the holes 7, 9 and 15 are aligned.

Figure 14:
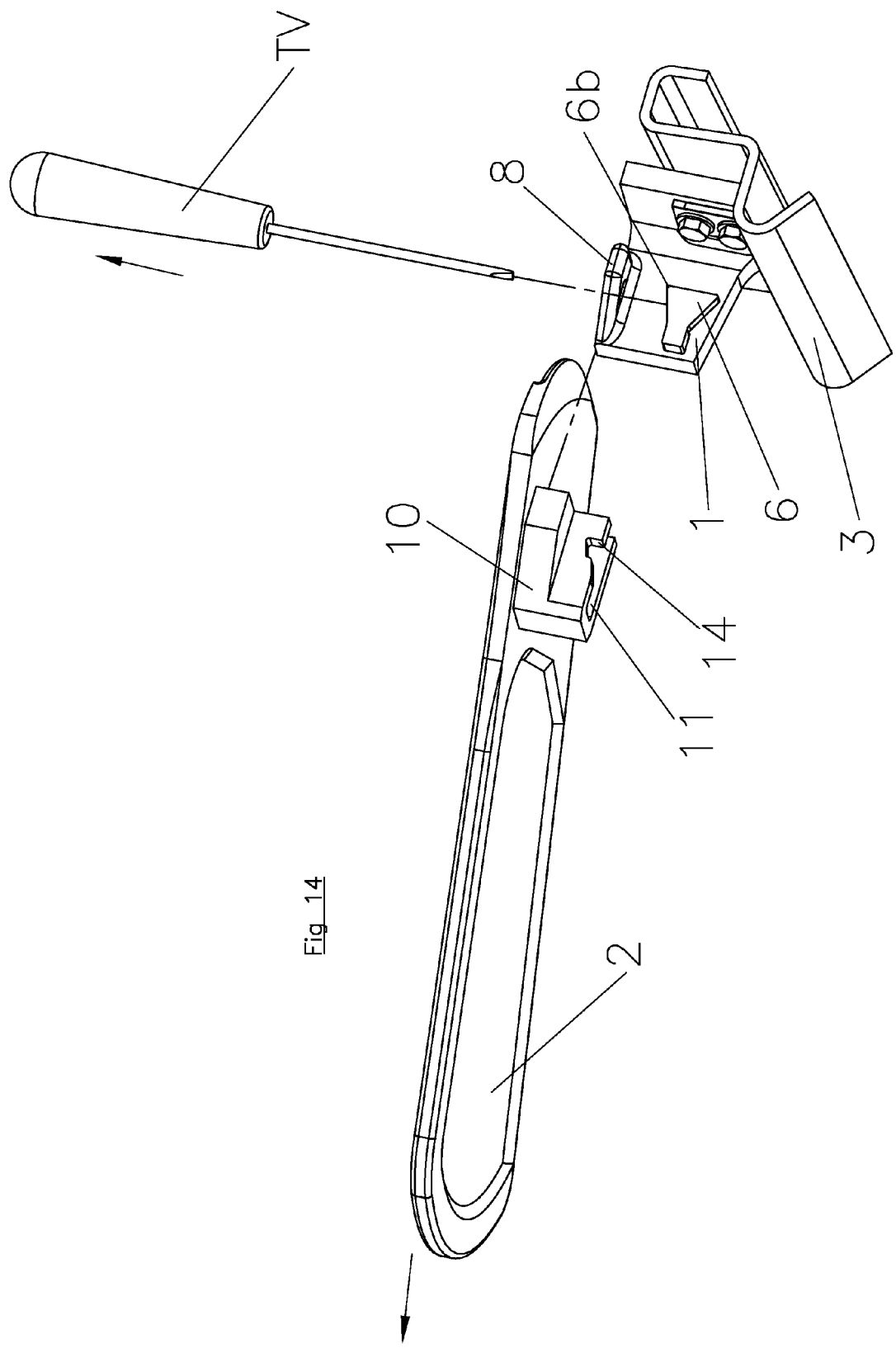

To replace a damaged scale 2B and more specifically its interchangeable part, (FIGS. 9 and 10), all is needed is to pivot the overlapping closest scale 2A, so as to uncover the hole 7 in the scale to be replaced, to insert and drive a shank such as the shank of a regular screwdriver TV into the opening made by the aligned holes 7, 9 et 15, to press on the swinging latch 6 (FIG. 12) by pulling on the scale to remove it from the notch 14 (FIG. 13), which is made possible by the oblong shape of the hole 9, then after having removed the shank TV, to take out the scale using a translation movement parallel to the plane of said scale (FIG. 14).

The installation of the new interchangeable part can be done even more simply in a quasi instantaneous manner, by just sliding the socket 10 on the coupling portion 1B' of the part 1, the locking of both parts being achieved automatically at the end of travel of the socket. During which, the swinging latch 6 slides on the edge of the wall 13 and is pivoted downward using its sloped upper edge 6a by creating a torsion torque under the effect of which said latch is pushed upward after going over the shoulder or notch 14 while thus locking securely the second part 2-10 of the scale on the first fixed part 1 of the latter.

We claim:

1. A scale assembly for an articulated fruit receiving platform comprising:
   a carrying boom;
   an anchor and articulation first part having a fastening lug, said fastening lug attached to said carrying boom, said first part having a flexible articulation and assembling lug attached to said fastening lug, said first part being formed of a thermoplastic elastomer; and
   a scale having a flat surface and a socket fastening block extending from said flat surface, said assembling lug having a swinging latch integral therewith, said socket fastening block having a notch formed on a side opposite said flat surface, said swinging latch engaged with said notch so as to automatically interlock said first part with said scale, said assembling lug being selectively disengageable from said socket fastening block.

2. The scale assembly of claim 1, each of said flat surface and said socket fastening block and said assembling lug having an opening formed therein, the openings being axially aligned, the opening of said flat surface opening to a side of said flat surface opposite said socket fastening block.

3. The scale assembly of claim 2, the openings comprising a hole formed through a thickness of said flat surface and an oblong port formed on a support plate of said socket fastening block and a hole formed in a wall of said socket fastening block extending downwardly from said support plate.

4. The scale assembly of claim 1, said scale having a hole extending through a thickness of said flat surface, said socket fastening block having a port aligned with said hole of said scale so as to allow access to said swinging latch from above said flat surface.

5. The scale assembly of claim 4, said socket fastening block having a first slot formed therein, said first slot engaging an engagement portion of said assembling lug.

6. The scale assembly of claim 5, said first slot being oriented obliquely relative to a longitudinal axis of said scale.

7. The scale assembly of claim 5, said engagement portion of said assembling lug having an upper edge with a support plate thereon, said support plate extending transverse to said engagement portion, said socket fastening block having a second slot formed adjacent an underside of said flat surface, said second slot receiving said support plate therein.

8. The scale assembly of claim 7, said support plate having an oblong port formed therein formed directly above said swinging latch.

9. The scale assembly of claim 7, said support plate having beveled edges at a front end thereof.

10. The scale assembly of claim 4, said swinging latch having a catch formed thereon, said catch engaging said notch.

11. The scale assembly of claim 4, said swinging latch being a single piece and attached elastically to a lateral face of said engagement portion.

12. The scale assembly of claim 4, said swinging latch having a sloped upper edge.

13. The scale assembly of claim 1, said first part being integrally formed together of a thermoplastic elastomer polyester, said scale being formed of a polyamide material.

* * * * *